United States Patent
Li et al.

(10) Patent No.: US 8,958,369 B2
(45) Date of Patent: Feb. 17, 2015

(54) METHOD FOR PROCESSING CHANNEL STATE INFORMATION, AND USER EQUIPMENT

(75) Inventors: Yu Ngok Li, Shenzhen (CN); Huaming Wu, Shenzhen (CN); Yan Xue, Shenzhen (CN); Changqing Zhu, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 242 days.

(21) Appl. No.: 13/813,263

(22) PCT Filed: Jun. 21, 2011

(86) PCT No.: PCT/CN2011/076072
§ 371 (c)(1),
(2), (4) Date: Jan. 30, 2013

(87) PCT Pub. No.: WO2011/160581
PCT Pub. Date: Dec. 29, 2011

(65) Prior Publication Data
US 2013/0148533 A1    Jun. 13, 2013

(30) Foreign Application Priority Data
Jun. 21, 2010    (CN) .......................... 2010 1 0210853

(51) Int. Cl.
*H04Q 7/00*       (2006.01)
*H04W 24/02*   (2009.01)
*H04L 25/02*     (2006.01)
*H04W 24/10*   (2009.01)

(52) U.S. Cl.
CPC ........... *H04W 24/02* (2013.01); *H04L 25/0202* (2013.01); *H04W 24/10* (2013.01)
USPC ............................ 370/328; 370/252; 370/329

(58) Field of Classification Search
None
See application file for complete search history.

(56) References Cited

U.S. PATENT DOCUMENTS

| 2008/0165875 | A1  | 7/2008  | Kotecha et al. |
| 2012/0106374 | A1* | 5/2012  | Gaal et al. ...................... 370/252 |
| 2012/0120846 | A1* | 5/2012  | Hwang et al. ................. 370/254 |
| 2012/0264441 | A1* | 10/2012 | Chandrasekhar et al. .... 455/450 |
| 2013/0021926 | A1* | 1/2013  | Geirhofer et al. ............. 370/252 |

(Continued)

FOREIGN PATENT DOCUMENTS

| CN | 101394378 A | 3/2009 |
| CN | 101686549 A | 3/2010 |
| CN | 101867457 A | 10/2010 |

OTHER PUBLICATIONS

CATT, CSA RS muting and interference measurement. 3GPP TSG RAN WG1 Meeting #60bis R1-102055, 2 pages, Beijing, China Apr. 12, 2010-Apr. 16, 2010.

(Continued)

*Primary Examiner* — Duc C Ho
(74) *Attorney, Agent, or Firm* — Jenkins, Wilson, Taylor & Hunt, P.A.

(57) ABSTRACT

The disclosure provides a method for processing Channel State Information (CSI), and a User Equipment (UE). The method comprises: a UE measuring a channel on a CSI reference signal (CSI-RS) resource when a neighboring cell performs coordinated muting on the resource corresponding to the CSI-RS (S102); the UE obtaining a first Channel Quality Indicator (CQI), according to the measuring of the channel when a neighboring cell performs coordinated muting on the resource corresponding to the CSI-RS (S104). The disclosure can improve the channel estimation quality of the CSI-RS.

20 Claims, 3 Drawing Sheets a UE measures a channel on a CSI-RS resource when a neighbouring cell performs coordinated muting on the resource corresponding to the CSI-RS — S102 the UE obtains a first CQI, according to the measuring of the channel when the neighbouring cell performs coordinated muting on the resource corresponding to the CSI-RS — S104

(56) References Cited

U.S. PATENT DOCUMENTS

2013/0044685 A1* 2/2013 Fong et al. .................. 370/328
2013/0344909 A1* 12/2013 Davydov et al. ............. 455/501
2014/0185527 A1* 7/2014 Kim et al. ................... 370/328

OTHER PUBLICATIONS

International Search Report and Written Opinion corresponding to International Patent Application PCT/CN2011/076072 dated Sep. 29, 2011.

ZTE, Interference coordination for control channels under non-CA based heterogeneous deployments. 3GPP TSG RAN WG1 Meeting #61bis R1-103597, 10 pages, Dresden, Germany Jun. 28, 2010-Jul. 2, 2010.

ZTE, Interference coordination for control channels under non-CA based heterogeneous deployments. 3GPP TSG RAN WG1 Meeting #62 R1-104566, 10 pages, Madrid, Spain Aug. 23, 2010-Aug. 27, 2010.

* cited by examiner

METHOD FOR PROCESSING CHANNEL STATE INFORMATION, AND USER EQUIPMENT

CROSS-REFERENCE TO RELATED APPLICATIONS

This application is filed under the provisions of 35 U.S.C. §371 and claims the priority of International Patent Application No. PCT/CN2011/076072 filed on Jun. 21, 2011, and of Chinese Patent Application No. 201010210853.X filed on Jun. 21, 2010. The disclosures of the foregoing international patent application and Chinese patent application are hereby incorporated by reference herein in their respective entireties.

TECHNICAL FIELD

The disclosure relates to the communication field, and more particularly to a method for processing Channel State Information (CSI), and a User Equipment (UE).

BACKGROUND

A Long-Term Evolution Advanced (LTE-Advanced) system may introduce a Coordinate Multipoint Transmission and Reception (COMP) technology among network levels so as to perform an inter-cell interference coordination to improve a cell throughput. In addition, an inter-cell interference in a heterogeneous network is generally more serious than that in a homogeneous network, and the inter-cell interference coordination can be also applied in the heterogeneous network to reduce the inter-cell interference. Here, the homogeneous network mainly refers to a deployment scenario in which only macro Evolved Node Base stations (eNBs) and users are deployed in a network, while the heterogeneous network mainly refers to a deployment scenario in which Low Power Nodes (LPNs) are placed in a macro cell. The LPNs comprise Remote Radio Heads (RRHs), Pico eNBs for covering hotspot areas, Home eNBs (HeNBs), and relay nodes etc.

Two pilot frequencies, i.e. CSI-Reference Signals (CSI-RSs) and Demodulation Reference Signals (DMRSs) of the LTE-Advanced system have been defined in the $56^{th}$ conference of the LTE of the $3^{rd}$ Generation Partnership Project (3GPP), wherein it is clarified that the CSI-RSs are cell-specific and are distributed more sparsely on time-frequency resources relative to demodulation pilot frequencies.

The CSI-RSs of the LTE-Advanced system not only can support a channel of a receiving terminal (e.g. a UE) on a port of each antenna of a current cell, but also can support measurement of channels of a neighbouring cell, wherein the CSI-RSs of each cell in a measurement set can be measured by applying the CSI-RSs to a COMP technology, and the CSI of a neighbouring cell can be measured by applying the CSI-RSs on a heterogeneous network. CSI-RS resources of each cell should be deployed orthogonally so that the measurement result is more accurate and closer to that of real channels.

It is put forward in some proposals in a related art that when a target cell in a certain cooperative measurement set sends CSI-RSs, other cells in the cooperative measurement set send data on a part of time-frequency resources in time-frequency resources corresponding to the CSI-RSs of the target cell, and no signals are sent on another part of the time-frequency resources which are called muting reference signal resources. The partial orthogonal technology for the CSI-RSs is called partial muting.

For different UEs, there may be inter-cell cooperation finally during an actual transmission, or there may be no inter-cell cooperation during the actual transmission. However, in the related art, the channels of the neighbouring cell are measured without sending any signals, but the fact that the inter-cell cooperation may be dynamic is not considered. Therefore, a channel estimation quality of the CSI-RS is not high.

In addition, only one Channel Quality Indicator (CQI) is fed back on one feedback time-frequency granularity in the related art. However, the inter-cell cooperation may be dynamic; for different UEs, there may be the inter-cell cooperation finally during the actual transmission, or there may be no inter-cell cooperation. If only one CQI is fed back, the CQI can be only based on a CQI having cooperation or a CQI having no cooperation; or, the CQI can be only based on a CQI having cell interference or a CQI having no cell interference in the heterogeneous Network scenario. In addition, the CQI should support transmission having cooperation and transmission having no cooperation at the same time. The CQIs of these two kinds of transmission are evidently different. Therefore, good link self-adaption cannot be achieved if only one CQI is fed back, which further influences the system performance. There may be the inter-cell cooperation finally, or there may be no inter-cell cooperation, thus if only one CQI is fed back, the CQI can be only based on a CQI having cooperation or a CQI having no cooperation, or the CQI in a heterogeneous network can be only based on a CQI having cooperation cell interference or can be only based on a CQI without interference. However, the CQI have to support transmission having cooperation and transmission having no cooperation at the same time while the CQIs of these two kinds of transmission may be different somehow. Thus if there is only one CQI, the performance of link self-adaption may be influenced to a certain extent.

SUMMARY

The disclosure provides a solution for processing CSI to at least solve one of the problems above.

A method for processing CSI is provided according to an aspect of the disclosure. The method comprises: a User Equipment (UE) measuring a channel on a CSI Reference Signal (CSI-RS) resource when a neighbouring cell performs coordinated muting on a resource corresponding to the CSI-RS; the UE obtaining a first Channel Quality Indicator (CQI), according to the measuring of the channel when the neighbouring cell performs coordinated muting on the resource corresponding to the CSI-RS.

Preferably, the method further comprises: the UE measuring a channel on a CSI-RS resource when a neighbouring cell does not perform coordinated muting on the resource corresponding to the CSI-RS; the UE obtaining a second CQI, according to the measuring of the channel when the neighbouring cell does not perform coordinated muting on the resource corresponding to the CSI-RS.

Preferably, after the UE obtains the first CQI and the second CQI, the method further comprises: the UE feeding back the first CQI and the second CQI to a transmitting node.

Preferably, the method further comprises: the UE using pre-defined feedback information to perform feedback to a transmitting node, wherein the pre-defined feedback information is used for indicating a state that the UE is interfered by a neighbouring cell.

Preferably, after the UE obtains the first CQI and the second CQI, the method further comprises: the UE feeding back a difference between the first CQI and the second CQI, and either the first CQI or the second CQI to a transmitting node.

Preferably, the UE sends the second CQI and a ΔCQI to the transmitting node, wherein the ΔCQI is equal to the first CQI minus the second CQI.

Preferably, the transmitting node comprises at least one of the followings: a macro Evolved Node Base station (eNB) and a Low Power Node (LPN).

Preferably, if a control channel of the macro eNB and a control channel of the LPN are transmitted separately in a time domain, the macro eNB and the LPN distribute control channel resources according to the first CQI.

Preferably, in a case that a system applying the method supports to perform an inter-cell interference coordination in a muting manner, when a target cell sends a CSI-RS, its neighbour interfering cells in a cooperation set send data on a part of time-frequency resources corresponding to the CSI-RS of the target cell, and do not send any data on another part of the time-frequency resources corresponding to the CSI-RS.

Preferably, the time-frequency resources are subframes and a part of the subframes belong to one subframe subset, and the neighbour interfering cells send the data on the part of the subframes; another part of the subframes belong to another subframe subset and the neighbour interfering cells do not send any data on the another part of the subframes.

A user equipment (UE) is provided according to another aspect of the disclosure. The UE comprises: a measuring module, configured to measure a channel on a Channel State Information Reference Signal (CSI-RS) resource when a neighbouring cell performs coordinated muting on a resource corresponding to the CSI-RS; an obtaining module, configured to obtain a first Channel Quality Indicator (CQI), according to the measuring of the channel when the neighbouring cell performs coordinated muting on the resource corresponding to the CSI-RS.

Preferably, the measuring module is further configured to measure a channel on a CSI-RS resource when a neighbouring cell does not perform coordinated muting on the resource corresponding to the CSI-RS; the obtaining module is further configured to obtain a second CQI, according to the measuring of the channel when the neighbouring cell does not perform coordinated muting on the resource corresponding to the CSI-RS.

Preferably, the UE further comprises: a feedback module, configured to feed back the first CQI and the second CQI to a transmitting node.

Preferably, the UE further comprises: a feedback module, configured to feed back a difference between the first CQI and the second CQI, and either the first CQI or the second CQI to a transmitting node.

By applying the disclosure, the UE measures the channel on a reference signal resource when a neighbouring cell performs coordinated muting on a resource corresponding to the CSI-RS, and the UE obtains the first CQI, according to the measuring of the channel when the neighbouring cell performs coordinated muting on the resource corresponding to the CSI-RS, thus solving the problem of bad CSI-RS channel estimation quality caused by not considering the fact that the inter-cell cooperation may be dynamic in the related art, so as to further improve the channel estimation quality of the CSI-RS. The disclosure can further solve the problem in the prior wireless communication system that low data transmission rate of the system is caused by the influence of the fed-back CSI, which is not comprehensive and correct enough, on the link self-adaption.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure will be described in details below with reference to the accompanying drawings and in combination with the embodiments. It should be noted that, if there is no conflict, the embodiments of the disclosure and the characteristics in the embodiments can be combined with one another.

The embodiments below can be applied to a system having cooperative transmission or interference coordination. The system can perform an inter-cell interference coordination in a muting manner (hereinafter referred to as partial muting), which will be taken as an example in the illustrations below. In the case that the system can support the partial muting, when a target cell in a cooperative measurement set send a CSI-RS, other cells (which can be called interfering cells of the target cell) in the cooperative measurement set send data on a part of time-frequency resources in time-frequency resources corresponding to the CSI-RS of the target cell, and do not send any signals (or do not send any data) on another part of the time-frequency resources corresponding to the CSI-RS. The part of the time-frequency resources can be also understood as subframes (of course, "subframe" is only an example and not used for the purpose of limitation), i.e. a part of the subframes belong to a subframe subset on which data are sent and another part of the subframes, also known as almost blank subframes, belong to another subframe subset on which no data is sent.

Embodiment 1

Figure 1:
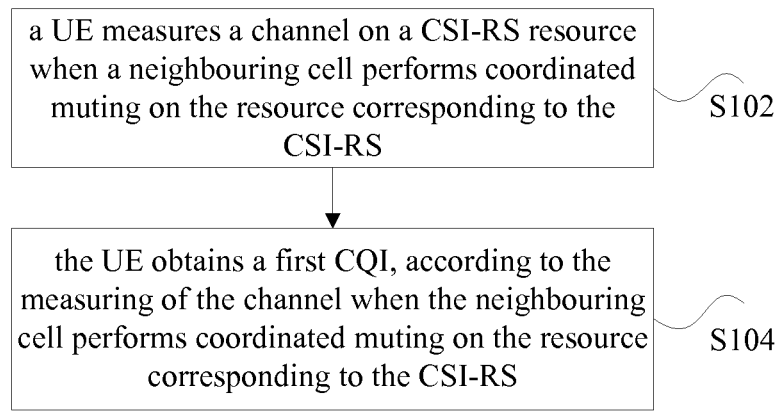
FIG. 1 is a flowchart of a method for processing CSI according to an embodiment of the disclosure.

In the present embodiment, a method for processing CSI is provided. FIG. 1 is a flowchart of a method for processing CSI according to an embodiment of the disclosure. As shown in FIG. 1, the flow comprises the following steps:

Step S102: a UE measures a channel on a CSI-RS resource when a neighbouring cell performs coordinated muting on a resource corresponding to the CSI-RS; and Step 104: the UE obtains a first CQI, according to the measuring of the channel when the neighbouring cell performs coordinated muting on the resource corresponding to the CSI-RS.

Through the steps above, data are not transmitted on a Resource Element (RE) of a CSI-RS of a cooperation cell to improve the estimation quality of a mobile terminal for the CSI-RS of the cooperation cell.

Preferably, the UE measures a channel on a CSI-RS resource when a neighbouring cell does not perform coordinated muting on the resource corresponding to the CSI-RS, and obtains a second CQI, according to the measuring of the channel when the neighbouring cell does not perform coordinated muting on the resource corresponding to the CSI-RS. Through the preferable embodiment, interference can be estimated reasonably by sending data on an RE position of the CSI-RS of a cooperation cell.

Preferably, the UE can feedback the first CQI and the second CQI to a transmitting node (e.g. a macro eNB, or an LPN).

Preferably, the UE can further feedback a difference between the first CQI and the second CQI, and either the first CQI or the second CQI to the transmitting node. For example, the UE feeds back the second CQI and a ΔCQI to the transmitting node, wherein the ΔCQI is equal to the first CQI minus the second CQI.

Preferably, different information is respectively measured on the CSI-RS resource muting for neighbouring cells and on the CSI-RS resource not muting for neighbouring cells. Besides feeding back the two pieces of different information in the form of CQIs, the UE can further define new feedback information to notify a base station of a state that the UE is interfered by a neighbouring cell.

By feeding back the first CQI and the second CQI by the UE, the problem of certain influence on the link self-adaption performance caused by only feeding back one CQI in the related art can be solved.

Figure 2:
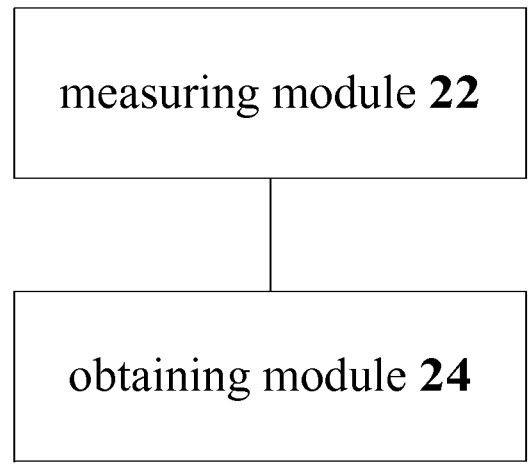
FIG. 2 is a structural diagram of a UE according to an embodiment of the disclosure.

In the present embodiment, a UE is also provided. FIG. 2 is a structural diagram of a UE according to an embodiment of the disclosure. As shown in FIG. 2, the UE comprises: a measuring module 22 and an obtaining module 24, which will be described hereinafter.

The measuring module 22 is configured to measure a channel on a Channel State Information Reference Signal (CSI-RS) resource when a neighbouring cell performs coordinated muting on a resource corresponding to the CSI-RS. The obtaining module 24 is coupled with the measuring module 22 and configured to obtain a first CQI, according to the measuring of the channel when the neighbouring cell performs coordinated muting on the resource corresponding to the CSI-RS.

Preferably, the measuring module 22 is further configured to measure a channel on a CSI-RS resource when a neighbouring cell does not perform coordinated muting on the resource corresponding to the CSI-RS. The obtaining module 24 is further configured to obtain a second CQI, according to the measuring of the channel when the neighbouring cell does not perform coordinated muting on the resource corresponding to the CSI-RS.

Figure 3:
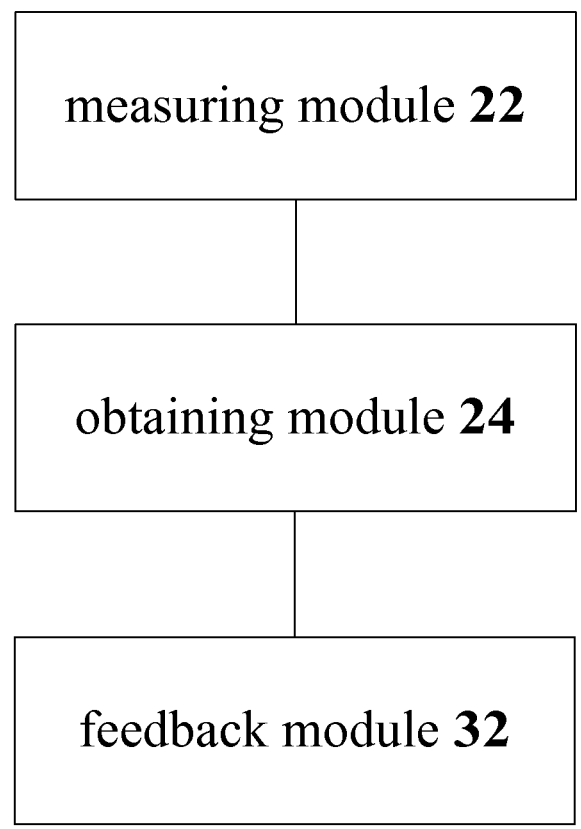
FIG. 3 is a preferable structural diagram of a UE according to an embodiment of the disclosure.

FIG. 3 is a preferable structural diagram of a UE according to an embodiment of the disclosure. As shown in FIG. 3, the UE further comprises: a feedback module 32 configured to feed back the first CQI and the second CQI to a transmitting node, or the feedback module 32 is configured to feed back a difference between the first CQI and the second CQI, and either the first CQI or the second CQI to the transmitting node.

Preferably, the UE (e.g. the feedback module of the UE) feeds back pre-defined feedback information to the transmitting node, wherein the pre-defined feedback information is used for indicating a state that the UE is interfered by a neighbouring cell.

It should be noted that the CQI2 in the embodiment below corresponds to the first CQI in the first embodiment and the CQI1 in the embodiment below corresponds to the second CQI in the first embodiment.

Embodiment 2

In the present embodiment, a UE measures a channel on a reference signal resource when a neighbouring cell does not perform coordinated muting on the resource corresponding to the reference signal and obtains a CQI1 according to the measurement. The UE measures a channel on a reference signal resource when a neighbouring cell performs coordinated muting on a resource corresponding to the reference signal and obtains a CQI2 according to the measurement. It should be noted that the CQI2 in the embodiment corresponds to the first CQI in the first embodiment and the CQI1 in the embodiment below corresponds to the second CQI in the first embodiment.

The UE feeds back the two CQIs, i.e. CQI1 and CQI2, to a transmitting node which comprises: a macro eNB or an LPN.

Preferably, the UE can calculate a difference ΔCQI between CQI1 and CQI2 by using the following formula: ΔCQI=CQI2−CQI1. The UE feeds back two CQIs, i.e. CQI1 and ΔCQI to the transmitting node which comprises the macro eNB or the LPN.

Through the present embodiment, the terminal can measure the actual interference by using the CSI-RSs overlapped with data of the cooperation cells, and improve the estimation quality of the CSI-RSs of the cooperation cells by only sending the REs of the CSI-RSs.

Embodiment 3

In the present embodiment, the system in the cooperative transmission can be a COMP system, and a cooperation base station of the COMP system can also support the CSI-RS partial muting technology.

Figure 4:
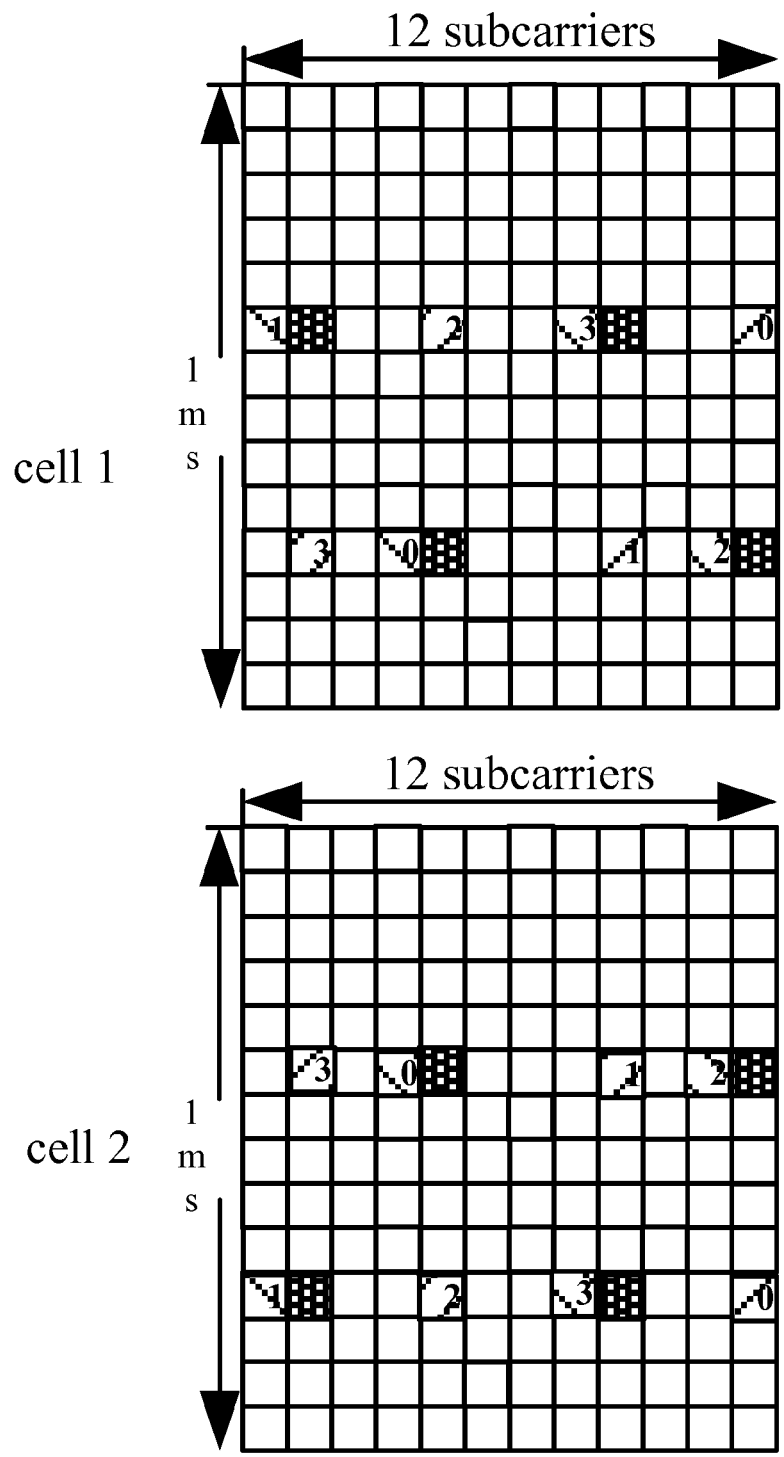
FIG. 4 is a schematic diagram of sending a CSI-RS on a subframe according to an embodiment of the disclosure.

The present embodiment considers the fact that in the COMP system, when a target cell in a cooperative measurement set sends CSI-RSs, other cells in the cooperative measurement set only send data on a part of physical resource blocks of time-frequency resources corresponding to the CSI-RSs of the target cell and do not send any data on other physical resource blocks. FIG. 4 is a schematic diagram of sending a CSI-RS on a subframe according to an embodiment of the disclosure. As shown in FIG. 4, it is provided that a cell in a cooperative measurement set sends CSI-RSs on one subframe. The REs filled by oblique lines in the figure represent the CSI-RSs, and the REs filled by grids represent REs not used for sending data.

The UE measures a channel on a reference signal when a neighbouring cell does not perform coordinated muting on the resource corresponding to the reference signal and obtains a CQI1 based on the measurement. The UE measures a channel on a reference signal resource when a neighbouring cell performs coordinated muting on a resource corresponding to the reference signal and obtains a CQI2 based on the measurement. The UE feeds back the two CQIs, CQI1 and CQI2 to a transmitting node which comprises a macro eNB.

In addition, the UE can further calculate the difference ΔCQI between CQI1 and CQI2 by using the following formula:

ΔCQI=CQI2−CQI1.

The UE feeds back two CQIs, i.e. CQI1 and ΔCQI, to the transmitting node which comprises a macro eNB or an LPN.

Embodiment 4

In the present embodiment, the system is a heterogeneous network system having interference coordination. The heterogeneous network system can comprise a macro eNB and an LPN comprising a HeNB. These different types of base stations can also support the CSI-RS partial muting technology.

The present embodiment considers the fact that, in the heterogeneous network system having interference coordination, a cooperative measurement set comprises a macro eNB and an LPN comprising a HeNB, and when the macro eNB sends CSI-RSs, other low power base stations in the cooperative measurement set only send data on a part of physical resource blocks of time-frequency resources corresponding to the CSI-RSs of a target low power base station, and do not send any data on other physical resource blocks. The UE measures a channel on a reference signal resource when a neighbouring cell does not perform coordinated muting on the resource corresponding to the reference signal and obtains a CQI1 based on the measurement. The UE measures a channel on a reference signal resource when a neighbouring cell performs coordinated muting on a resource corresponding to the reference signal and obtains a CQI2 based on the measurement. The UE feeds back the two CQIs, i.e. CQI1 and CQI2, to a transmitting node which comprises: a macro eNB or an LPN.

Preferably, the UE can calculate a difference ΔCQI between CQI1 and CQI2 by using the following formula:

$$\Delta CQI = CQI2 - CQI1.$$

The UE feeds back two CQIs, i.e. CQI1 and ΔCQI, to the transmitting node which comprises the macro eNB or the LPN.

Embodiment 5

In the present embodiment, the system is a heterogeneous network system performing interference coordination for a control channel. The heterogeneous network system can comprise a macro eNB and an LPN. These different types of base stations can also support the CSI-RS partial muting technology.

For the heterogeneous network system, many LPNs are added in the network. Compared with a homogeneous network, the macro eNB and the LPN generate very strong interference to each other on the same frequency band. The interference not only influences the data transmission capability of a data channel, and more seriously, will cause a decoding failure to the control channel, and result in abnormal communication.

A method for eliminating the interference of the control channel is transmit a control channel of the macro eNB and a control channel of the LPN separately on the time domain, i.e. a control channel is not transmitted by the LPN on a subframe on which a control channel is transmitted by the eNB, i.e. muting; and a control channel is not transmitted by the eNB on a subframe on which a control channel is transmitted by the LPN. In addition, one control channel can indicate the data scheduling of two continuous subframes, i.e. inter-subframe scheduling. Therefore, the interference on the control channels can be greatly reduced by muting of the control channels to ensure normal communication.

Because of muting of the control channels, the CQI measurement on the control channels is evidently different from that on the data channels. The channel states of the control channels and the data channels cannot be reflected at the same time if merely one kind of CQI measurement is used. The UE measures a reference signal resource not muting for a cooperation neighbouring cell to obtain a CQI1, and measures a reference signal resource muting for a cooperation neighbouring cell to obtain a CQI2. The UE feeds back the two CQIs, i.e. CQI1 and CQI2, to a transmitting node comprising a macro eNB or an LPN.

If the control channels of the macro eNB and the LPN are transmitted separately in the time domain, the macro eNB and the LPN should distribute appropriate control channel resources according to CQI2 so that the transmitting node can learn the channel states of the control channels and the data channels accurately to distribute appropriate resources for the control channels and the data channels. Therefore, link self-adaption can be better realized while ensuring the signal transmission reliability of the control channels and the data channels.

Through the embodiment above, an orthogonal design of CSI-RSs of different cells is maintained. The estimation quality of a mobile terminal for estimating the CSI-RSs of the cooperation cells can be improved by not sending data on the REs of CSI-RSs of the cooperation cells, and interference can be estimated reasonably by sending data on the positions of the REs of CSI-RSs of the cooperation cells. Compared with the method that data are not sent on all REs for sending CSI-RSs by neighbouring cells, the system throughput can be improved.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for processing Channel State Information (CSI), comprising:
   a User Equipment (UE) measuring a channel on a CSI Reference Signal (CSI-RS) resource when a neighbouring cell performs coordinated muting on a resource corresponding to the CSI-RS; and
   the UE obtaining a first Channel Quality Indicator (CQI), according to the measuring of the channel when the neighbouring cell performs coordinated muting on the resource corresponding to the CSI-RS.

2. The method according to claim 1, further comprising:
   the UE measuring a channel on a CSI-RS resource when a neighbouring cell does not perform coordinated muting on the resource corresponding to the CSI-RS; and
   the UE obtaining a second CQI, according to the measuring of the channel when the neighbouring cell does not perform coordinated muting on the resource corresponding to the CSI-RS.

3. The method according to claim 2, wherein after the UE obtains the first CQI and the second CQI, the method further comprises:
   the UE feeding back the first CQI and the second CQI to a transmitting node.

4. The method according to claim 3, wherein the transmitting node comprises at least one of the following: a macro Evolved Node Base station (eNB) and a Low Power Node (LPN).

5. The method according to claim 4, wherein if a control channel of the macro eNB and a control channel of the LPN are transmitted separately in a time domain, the macro eNB and the LPN distribute control channel resources according to the first CQI.

6. The method according to claim 2, further comprising:
the UE using pre-defined feedback information to perform feedback to a transmitting node, wherein the pre-defined feedback information is used for indicating a state that the UE is interfered by a neighbouring cell.

7. The method according to claim 6, wherein the transmitting node comprises at least one of the following: a macro Evolved Node Base station (eNB) and a Low Power Node (LPN).

8. The method according to claim 7, wherein if a control channel of the macro eNB and a control channel of the LPN are transmitted separately in a time domain, the macro eNB and the LPN distribute control channel resources according to the first CQI.

9. The method according to claim 2, wherein after the UE obtains the first CQI and the second CQI, the method further comprises:
the UE feeding back a difference between the first CQI and the second CQI, and either the first CQI or the second CQI to a transmitting node.

10. The method according to claim 9, wherein the UE sends the second CQI and a ΔCQI to the transmitting node, wherein the ΔCQI is equal to the first CQI minus the second CQI.

11. The method according to claim 10, wherein the transmitting node comprises at least one of the following: a macro Evolved Node Base station (eNB) and a Low Power Node (LPN).

12. The method according to claim 11, wherein if a control channel of the macro eNB and a control channel of the LPN are transmitted separately in a time domain, the macro eNB and the LPN distribute control channel resources according to the first CQI.

13. The method according to claim 9, wherein the transmitting node comprises at least one of the following: a macro Evolved Node Base station (eNB) and a Low Power Node (LPN).

14. The method according to claim 13, wherein if a control channel of the macro eNB and a control channel of the LPN are transmitted separately in a time domain, the macro eNB and the LPN distribute control channel resources according to the first CQI.

15. The method according to claim 1, wherein in a case that a system applying the method supports to perform an inter-cell interference coordination in a muting manner, when a target cell sends a CSI-RS, its neighbour interfering cells in a cooperation set send data on a part of time-frequency resources corresponding to the CSI-RS of the target cell, and do not send any data on another part of the time-frequency resources corresponding to the CSI-RS.

16. The method according to claim 15, wherein the time-frequency resources are subframes and a part of the subframes belong to one subframe subset, and the neighbour interfering cells send the data on the part of the subframes; another part of the subframes belong to another subframe subset and the neighbour interfering cells do not send any data on the another part of the subframes.

17. A user equipment (UE), comprising:
a measuring module, configured to measure a channel on a Channel State Information Reference Signal (CSI-RS) resource when a neighbouring cell performs coordinated muting on a resource corresponding to the CSI-RS; and
an obtaining module, configured to obtain a first Channel Quality Indicator (CQI), according to the measuring of the channel when the neighbouring cell performs coordinated muting on the resource corresponding to the CSI-RS.

18. The UE according to claim 17, wherein
the measuring module is further configured to measure a channel on a CSI-RS resource when a neighbouring cell does not perform coordinated muting on the resource corresponding to the CSI-RS; and
the obtaining module is further configured to obtain a second CQI, according to the measuring of the channel when the neighbouring cell does not perform coordinated muting on the resource corresponding to the CSI-RS.

19. The UE according to claim 18, further comprising:
a feedback module, configured to feed back the first CQI and the second CQI to a transmitting node.

20. The UE according to claim 18, further comprising:
a feedback module, configured to feed back a difference between the first CQI and the second CQI, and either the first CQI or the second CQI to a transmitting node.

* * * * *